US006799770B2

(12) United States Patent
Patrick et al.

(10) Patent No.: US 6,799,770 B2
(45) Date of Patent: Oct. 5, 2004

(54) RECLINABLE WHEELCHAIR

(76) Inventors: Jack Patrick, deceased, late of Martinez, GA (US); Gloria L. Patrick, legal representative, 608 Sawgrass Dr., Martinez, GA (US) 30907; Raymond Eugene Westbrook, 1321 Leverett Ave., Lincolnton, GA (US) 30817

( * ) Notice: Subject to any disclaimer, the term of this patent is extended or adjusted under 35 U.S.C. 154(b) by 127 days.

(21) Appl. No.: 10/106,569

(22) Filed: Mar. 26, 2002

(65) Prior Publication Data

US 2003/0184042 A1 Oct. 2, 2003

(51) Int. Cl.[7] .................................................. B62M 1/14
(52) U.S. Cl. ....................... 280/250.1; 5/81.1 R; 5/86.1
(58) Field of Search ...................... 280/250.1; 5/81.1 R, 5/86.1

(56) References Cited

U.S. PATENT DOCUMENTS 2,587,068 A * 2/1952 Sanders ........................ 5/86.1
3,786,523 A * 1/1974 Sele ............................ 5/87.1
3,967,328 A * 7/1976 Cox .......................... 5/81.1 C
4,079,990 A * 3/1978 McMunn et al. ............ 297/69
4,193,147 A * 3/1980 Fischer ......................... 5/87.1
4,700,415 A 10/1987 DiMatteo et al. ............. 5/81 R
4,776,047 A * 10/1988 DiMatteo ................... 5/81.1 C
4,837,873 A * 6/1989 DiMatteo et al. .......... 5/81.1 C
4,949,408 A * 8/1990 Trkla ............................ 5/86.1
5,228,747 A * 7/1993 Greene .................... 297/284.3
5,547,245 A * 8/1996 Knouse ....................... 297/85
5,584,082 A * 12/1996 Crawford et al. ............. 5/86.1
5,737,781 A * 4/1998 Votel ...................... 5/81.1 HS
5,971,482 A 10/1999 Goertzen et al. ........... 297/329
5,996,716 A 12/1999 Montiglio et al. ......... 180/65.5
6,003,891 A 12/1999 Broadhead ............... 280/304.1
6,154,690 A * 11/2000 Coleman ........................ 701/1
6,158,810 A 12/2000 Galloway ................ 297/354.1
6,206,393 B1 3/2001 Mascari et al. ............. 280/220

FOREIGN PATENT DOCUMENTS

JP 09290004 A * 11/1997 ............ A61G/1/00
JP 11197184 A * 7/1999 ............ A61G/1/02

* cited by examiner

*Primary Examiner*—Lesley D. Morris
*Assistant Examiner*—Daniel Yeagley
(74) *Attorney, Agent, or Firm*—Withers & Keys, LLC

(57) ABSTRACT

The present invention relates to a wheelchair that provides for efficient, safe transfer of a patient from the wheelchair to a bed or from a bed to the wheelchair. The wheelchair may be locked to a bed using small wheels attached to the wheelchair, that engages a track mounted onto the bed.

21 Claims, 12 Drawing Sheets

B-B

RECLINABLE WHEELCHAIR

FIELD OF THE INVENTION

The present invention relates to a reclinable wheelchair, which may be used to transfer a patient from a wheelchair to a bed or from a bed to a wheelchair.

BACKGROUND OF THE INVENTION

Reclinable wheelchairs are known in the art. For example, U.S. Pat. Nos. 5,971,482; 5,996,716; 6,003,891; and 6,158,810 disclose various wheelchairs, which focus on reclining or tilting a patient rearward to aid in patient care. Wheelchairs provide transportation and mobility to patients, while allowing the patient to recline for comfort.

Although conventional wheelchairs provide the above-mentioned features, conventional wheelchairs have limited capabilities. For example, the process of transferring a patient from a conventional wheelchair to a bed requires great effort by the patient and/or a caregiver. Transferring a patient that cannot assist the caregiver from a bed to a wheelchair or from a wheelchair to a bed often requires more than one caregiver. Depending on the patient's condition, the physical manipulation required by one or more caregivers to move a patient between a wheelchair and a bed can be dangerous to both the patient and the caregiver(s). Wheelchairs, such as those disclosed in the above-mentioned U.S. patents, which simply recline the seat back or tilt the back and seat together, do not lessen the danger or ease the difficulty associated with the patient transfer process.

What is needed in the art is a wheelchair, which provides a simple, safe, and cost-effective way of transferring a patient from a wheelchair to a bed and vice versa. What is also needed in the art is wheelchair and bed combination, which simplifies the patient transfer process and enhances the safety of the process.

SUMMARY OF THE INVENTION

The present invention is directed to a reclinable wheelchair that facilitates the transfer of a patient from the wheelchair to a bed and from a bed to the wheelchair. The wheelchair has a number of features, which allows a patient to safely move from the wheelchair to a bed. In one embodiment of the present invention, the wheelchair is capable of locking to the side of a bed, placing the patient in a supine position, so that the patient can roll or slide onto the bed.

The present invention is also directed to a method of transferring a patient from a wheelchair to a bed and from a bed to a wheelchair in a manner that is safe for both the patient and a caregiver, if present. The method may be practiced in hospitals, nursing homes, personal care homes, or private homes.

These and other features and advantages of the present invention will become apparent after a review of the following detailed description of the disclosed embodiments and the appended claims.

BRIEF DESCRIPTION OF THE DRAWINGS

FIG. 1A is an enlargement of the optional actuator assembly shown in FIG. 1;

DETAILED DESCRIPTION OF THE INVENTION

The wheelchair of the present invention may be described with reference to FIGS. 1–11. However, it should be noted that the embodiments described with reference to FIGS. 1–11 are exemplary embodiments of the present invention, and should not be interpreted to limit the present invention in any way.

FIGS. 1–11 depict various components on the left-hand or right-hand side of the exemplary wheelchair; however, it is to be understood that components shown may be located on one (i.e., left or right side) or both sides of the wheelchair. Each drawing may not include all components of the wheelchair of the present invention, and may focus on a particular feature of the wheelchair.

Figure 1:
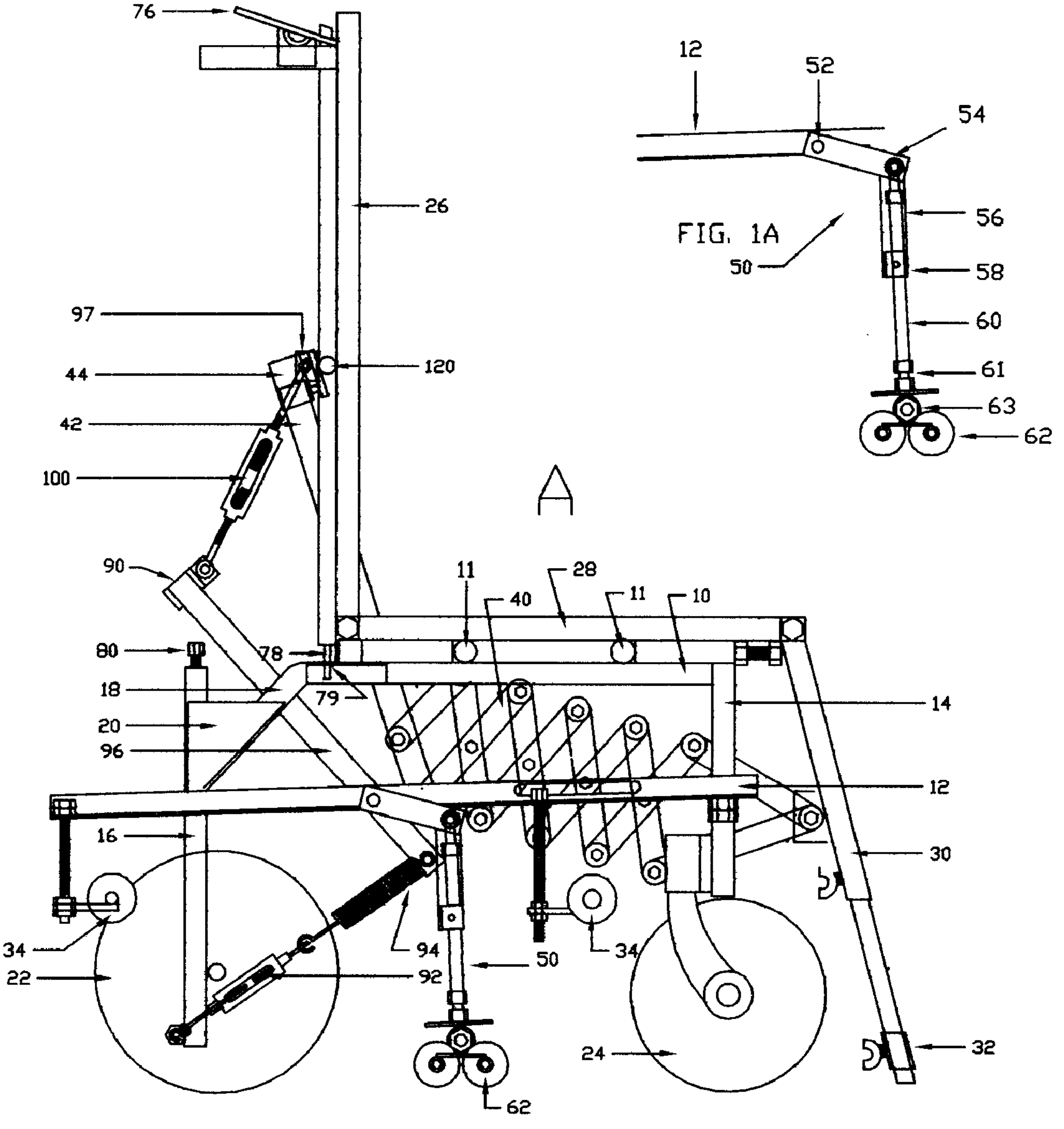
FIG. 1 is a side view of an exemplary wheelchair of the present invention.

FIG. 1 depicts an exemplary wheelchair A of the present invention. Wheelchair A comprises the following elements: a frame consisting of two parallel upper longitudinal support members 10, two parallel lower longitudinal support members 12, two parallel front vertical support members 14, two parallel rear vertical support members 16, and lateral support members 11 (also shown in FIG. 8). Support members 18 connect vertical support members 16 to longitudinal support members 10. Support members 18 extend from the junction of members 16 and 12 up to the rear end of members 10 at a predetermined angle. The frame may be strengthened with triangular reinforcement members 20, which enclose the area between the portions of support members 16 above the junction with longitudinal support members 12 and support members 18. Rear wheels 22 are attached to vertical support members 16 for mobility, and front caster wheels 24 are attached to vertical support members 14 to provide for chair mobility, steerage, and rotation. Wheelchair A includes seat back 26, seat 28, leg supports 30, and footrests 32.

Figure 3:
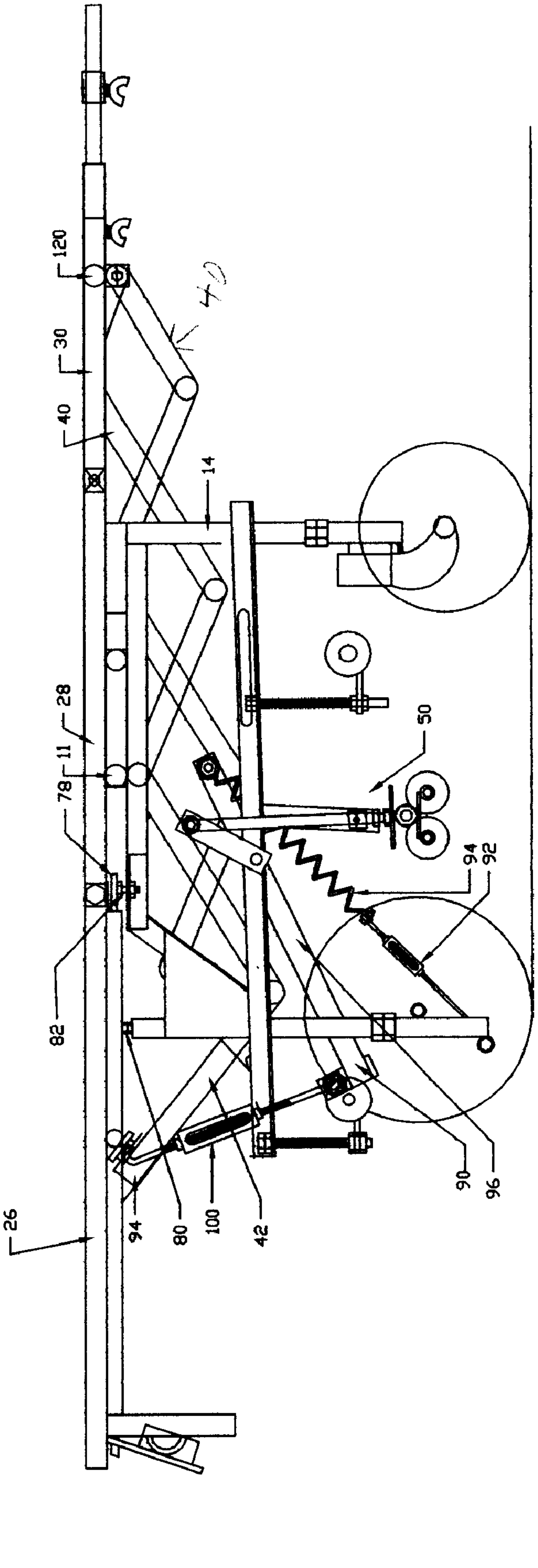
FIG. 3 is a side view of an exemplary wheelchair of the present invention in a gurney position.
Figure 4:
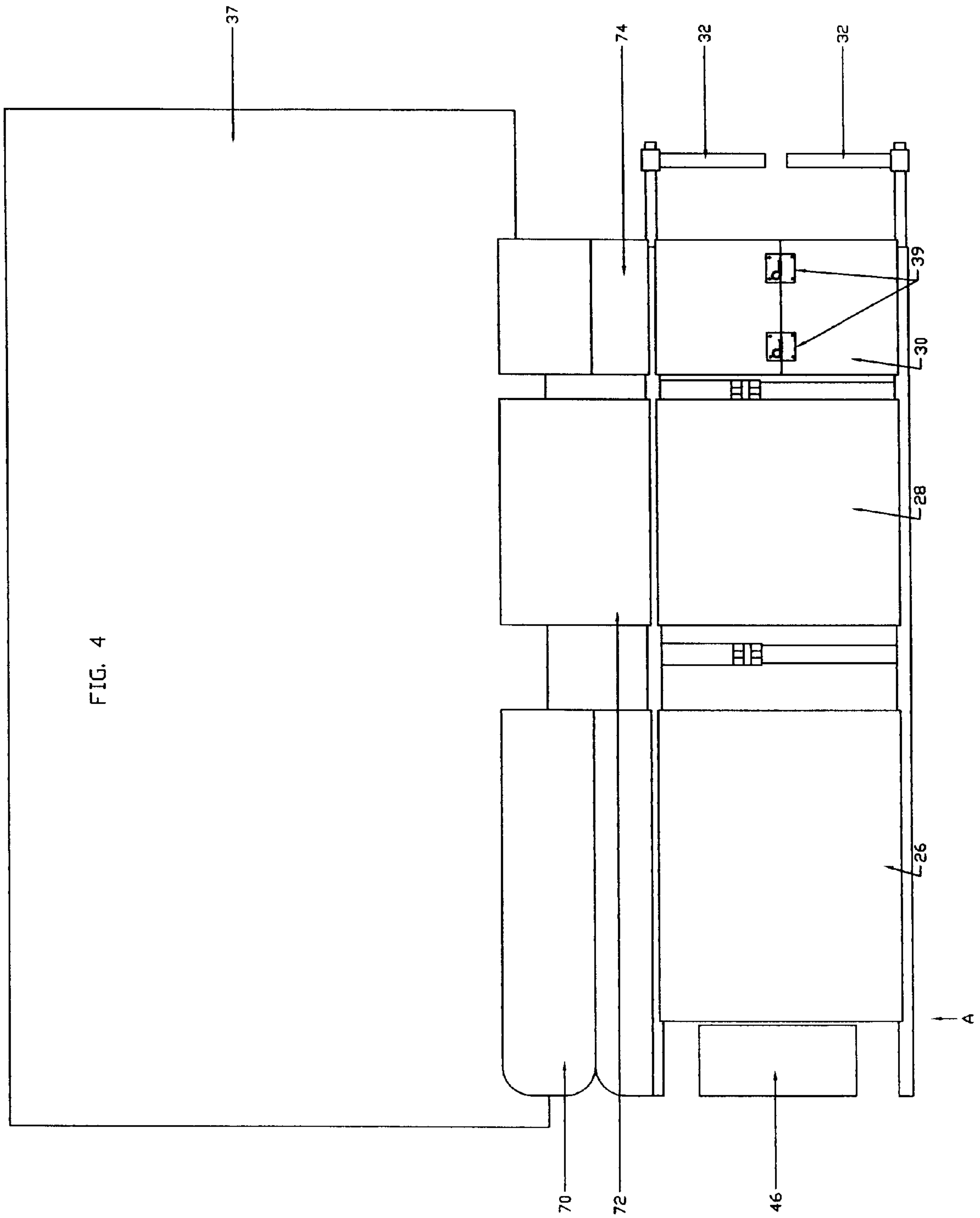
FIG. 4 is an overhead view of an exemplary wheelchair of the present invention in a gurney position positioned next to a bed with bed bridge in place and ready for patient transfer.

Wheelchair A may be reclined such that the seat back 26, the leg supports 30, and foot rests 32, form a flat plane with the seat 28 (hereinafter referred to as a "gurney position"), as shown in FIGS. 3 and 4. To convert wheelchair A to a gurney position, the caregiver first depresses the safety handle 76, which disengages the pin locking mechanism 78 from openings 79 in longitudinal support members 10. Disengagement of pin locking mechanism 78 from an opening 79 in longitudinal support members 10 and the addition of a force on seat back 26 causes seat back 26 to recline. As the seat back 26 reclines, scissor mechanism 40 expands, which causes the leg supports 30 and foot rests 32 to raise toward a flat position. Scissor mechanism 40 comprises extension rods 42 and extension rod guides 44. Although scissor mechanism 40 is shown in FIG. 1, it should be noted that alternative mechanisms may be used to cause wheelchair A to recline including, but not limited to, a pneumatic piston system, a screw mechanism system, etc.

In a further embodiment of the present invention, wheelchair A may comprise locking wheels 34 for securing wheelchair to a bed as described below with reference to FIG. 2.

An optional actuator assembly 50 (shown in more detail in FIG. 1A) works in combination with the spring tension device 90 (described in detail below) to assist the conversion from an upright chair position to a gurney position as the wheelchair is locked to the bed. As shown in FIG. 1A, the actuator assembly 50 comprising a spring and actuator rod 52, actuator rotating rod 54, rod guide frame 56, rod guide 58, rod 60 with length adjustment 61, actuator wheels 62, and actuator wheel pivot means 63. Actuator assembly 50 is connected to rotating arm 96 through horizontal support member 12. Actuator wheels 62 are typically the same distance from the side of wheelchair A as locking wheels 34. Actuator wheels 62 and locking wheels 34 work in combination with one another as shown in FIGS. 2 and 2A.

Figures 2, 2A:
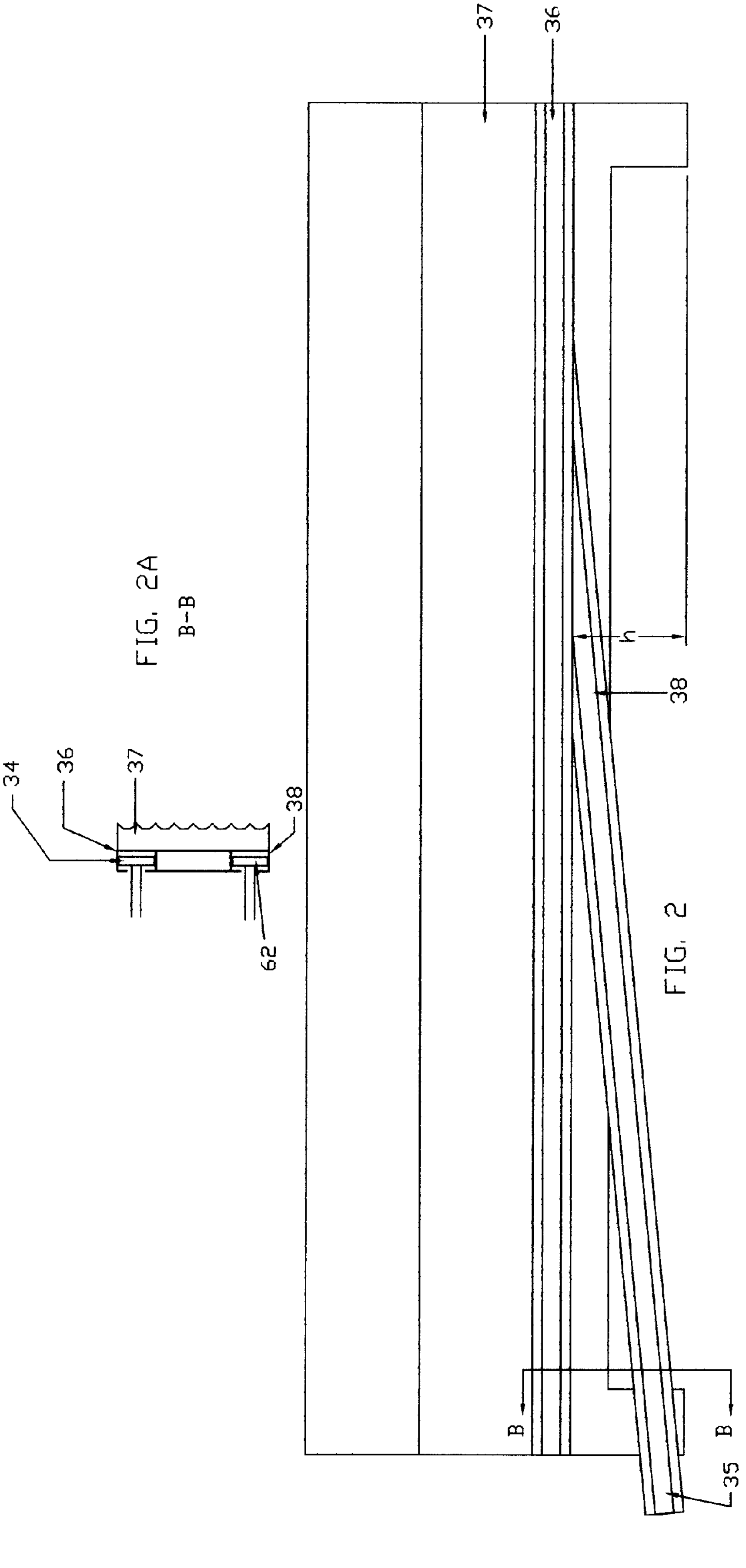
FIG. 2 is a side view of a horizontal track and an actuator track mounted to a bed.
FIG. 2A is a cross-sectional view of the horizontal track and actuator track with locking and actuator wheels engaged as viewed along line B—B in FIG. 2.

As shown in FIG. 2, actuator wheels 62 (shown in FIG. 2A) engage a first track 38 (hereinafter "actuator track") attached to bed 37. Actuator track 38 begins at floor level at one end 35 of bed 37 and rises at a desired angle to a height "h" as shown in FIG. 2. Locking wheels 34 (shown in FIG. 2A) engage with a second track 36 (hereinafter "locking track"), which is attached to bed 37 and is horizontal along bed 37. As the caregiver depresses the safety handle 76 (see FIG. 1) and pushes or pulls the wheelchair along the tracks next to bed 37, actuator wheels 62 move upward in actuator track 38 and the actuator rotating rod 54 rotates upward. Since the actuator rotating rod 54 is rigidly connected to the spring tension device 90, this upward movement of the actuator rotating rod 54 rotates the spring tension device 90 such that the turnbuckle 100 pulls the support tube 120 rearward and the seat back reclines (see detailed discussion of spring tension device 90 below). The scissors mechanism 40 simultaneously raises the leg supports and foot rests to a gurney position.

FIG. 2A depicts a cross-sectional view along line "B—B" in FIG. 2 when a wheelchair is engaged with bed 37. As shown in FIG. 2A, actuator wheels 62 engage actuator track 38 while locking wheels 34 engage with locking track 36, both tracks being secured along bed 37.

Once wheelchair A is locked to the bed, a patient can be transferred safely from the wheelchair to the bed or from the bed to the wheelchair using a bed bridge, as well as, an optional rolling transfer accessory, both discussed in detail below. The conversion to a gurney position is accomplished using parallel scissors mechanisms 40, extension rods 42, and extension rod guides 44 described above. As shown in FIG. 3, two parallel scissors mechanisms 40 (only one is shown) are secured at one end to an independent leg support 30, at the center to frame member 11, and at the other end to a detachable extension rod 42 that rests in an extension rod guide 44 attached to the seat back. As the seat back 26 reclines up to 90 degrees, the extension rod guides 44 exerts a force on extension rods 42, extending the scissors mechanism 40 and pushing the leg supports 30 upward about 90 degrees. In the fully reclined position, the patient is lying in a supine position, ready for transfer to the bed. By removing a screw (not shown) holding the scissors mechanisms 40 in place, the scissors mechanisms 40 may be detached from leg support 30, which may be elevated independently from the other leg support 30 in case only one of the extremities requires elevation.

Figure 5:
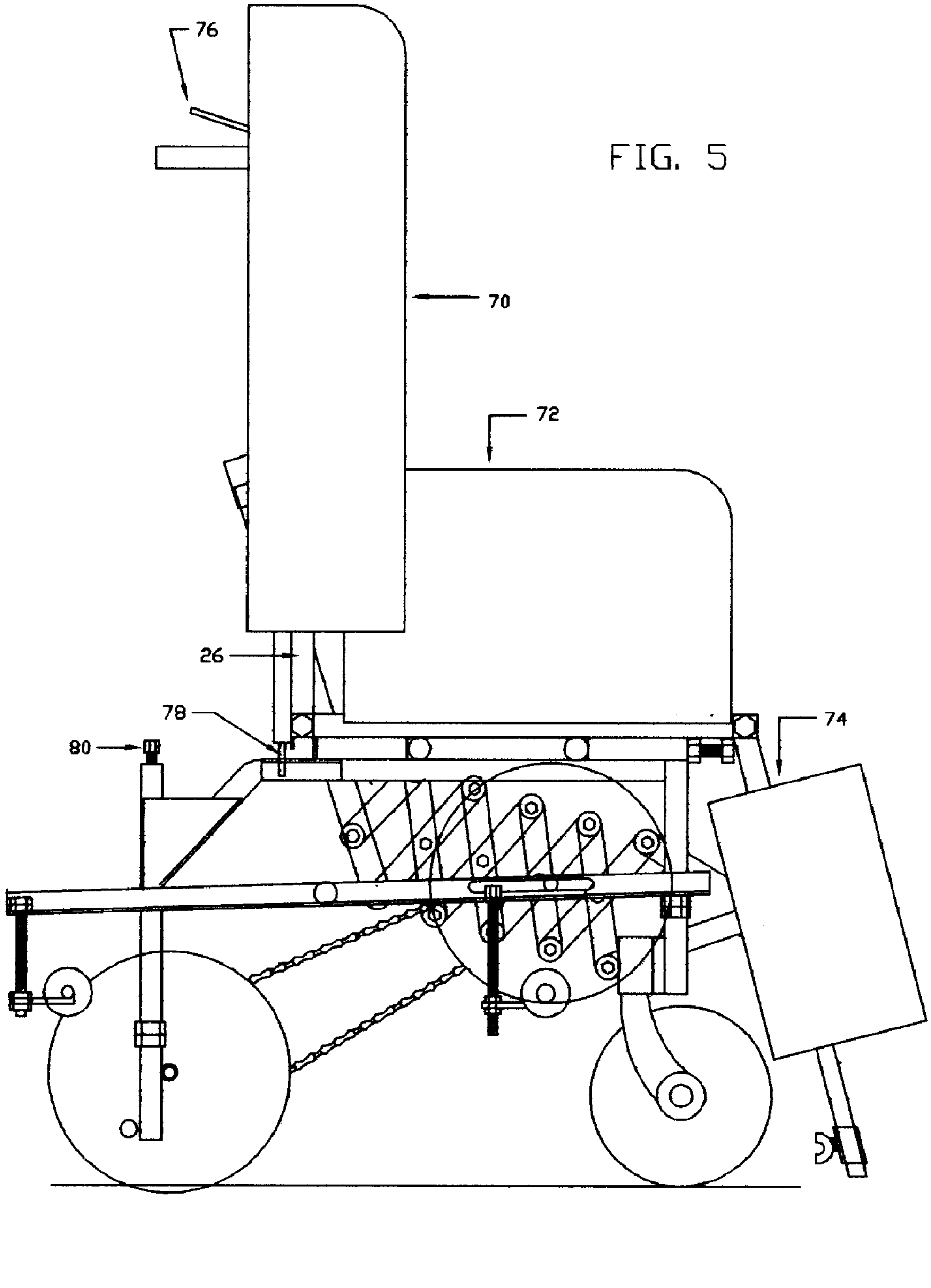
FIG. 5 is a side view of an exemplary wheelchair of the present invention in a sitting position with top rail, armrest, and leg rail in place.

Once the wheelchair is in a gurney position and locked to the bed, the patient can be transferred from the wheelchair, across a "bed bridge," and onto the bed. The bed bridge, shown in FIG. 4, covers the gap between the wheelchair A and the bed 37 and can support the weight of a patient. The bridge is formed using three safety rails: a top rail 70, an arm rail 72, and a leg rail 74. When the wheelchair is in the sitting position, top rails 70 and leg rails 74 are folded to provide short, padded side rails that ensure the comfort and safety of the patient as shown in FIG. 5. Arm rails 72 fold upward to provide armrests. When the chair is lowered into a gurney position, the rails on the side of the wheelchair adjacent to the bed are unfolded and locked into place to form a bed bridge.

The safety of the patient, as well as, the caregiver is a primary concern in the design of the wheelchair of the present invention. FIG. 5 shows a safety handle 76 that a caregiver can depress to recline the seat back 26. The handle is connected to spring-loaded safety pin 78 at the bottom of seat back 26, which engages one of three holes (not shown) in the seat frame depending on the recline angle of the seat back 26. When the safety handle is depressed, the pin 78 withdraws from the hole and the seat back 26 is free to recline. As the seat back 26 reclines, the spring-loaded pin 78 will engage a hole at one of two predetermined angles if the safety handle is not held. These additional stops allow the patient to be reclined at different angles if comfort or care requires, as well as, acting as a safety feature by preventing the seat back 26 from falling 90 degrees under the weight of the patient's upper body in the event that the handle 76 is bumped or accidentally depressed. When the seat back 26 has reclined 90 degrees to a flat plane, seat back 26 rests against an adjustable stop 80 that ensures desired positioning as shown in FIG. 3. In this position, the safety handle 76 is released and the spring-loaded safety pin 78 engages an adjustable stop 82 that prevents the seat back from moving until the safety handle is depressed (see FIG. 3).

Figure 6A:
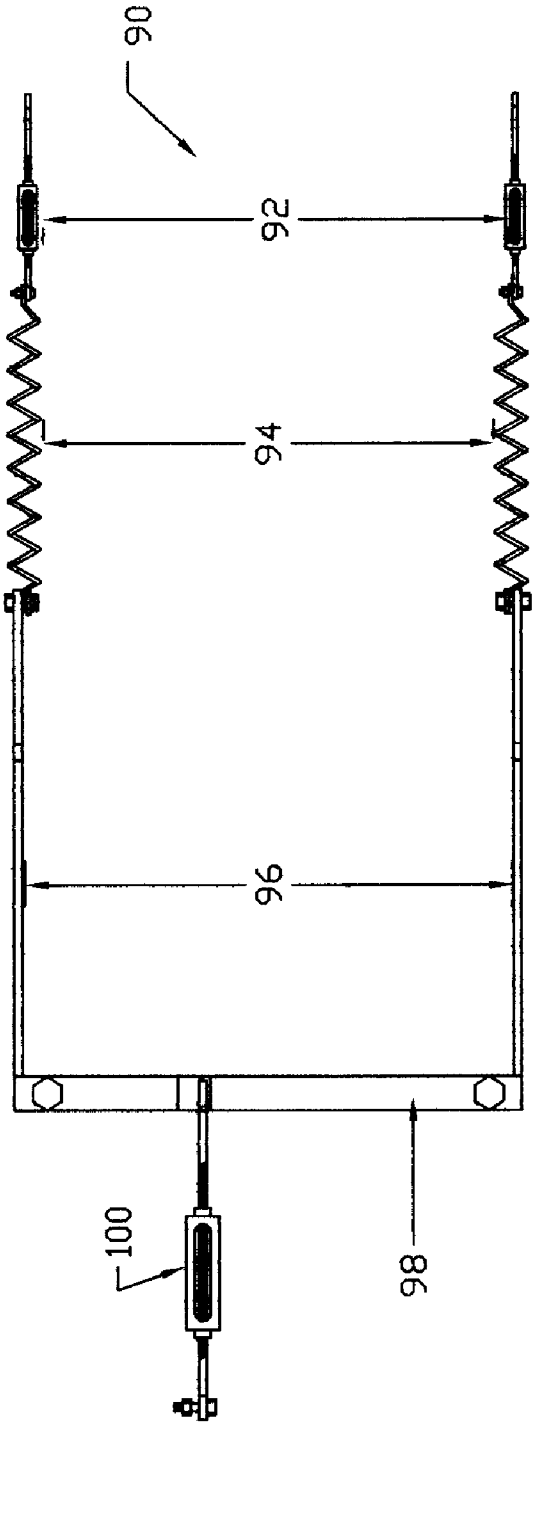
FIG. 6A is an overhead view of the exemplary spring tension device in FIG. 6.
Figure 6:
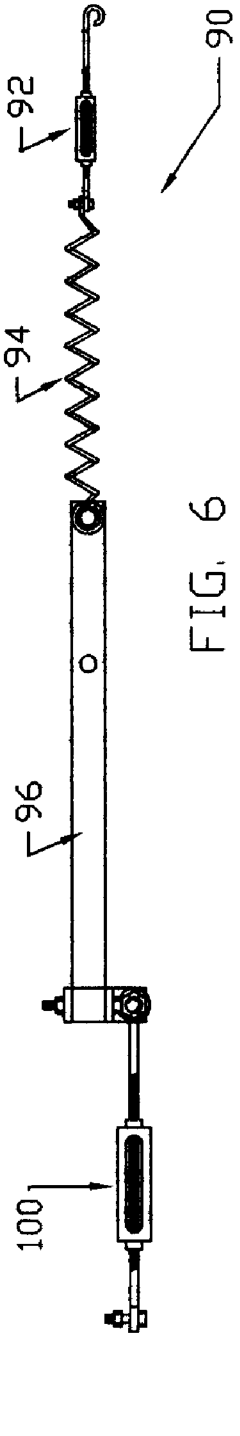
FIG. 6 is a side view of an exemplary spring tension device.

As illustrated in FIGS. 1 and 6, wheelchair A is equipped with a spring tension device 90 that allows the upper body weight of the patient to be easily and safely lowered while the patient's body weight raises the leg supports 30 to form a flat plane. Likewise, spring tension aids the caregiver in raising the upper body weight of the patient to a sitting position. The spring tension device 90 includes a turnbuckle 92 attached to the bottom of each vertical support member 16 for spring tension adjustment. Each turnbuckle 92 is then attached to a spring 94 that is connected to the end of a rotating arm 96. The rotating arms 96 pivot around mounting points on longitudinal support members 12 on opposite sides of the wheelchair. The ends of the rotating arms 96 opposite the springs 94 extend rearward and are connected to each other using a perpendicular support member 98 as shown in the top view of FIG. 6. The connecting support member 98 is then attached to a support tube 120 (shown in FIG. 1) on the rear side of the seat back 26 (not shown) by a turnbuckle 100 used for further adjustment.

As the seat back 26 reclines, the pivoting rotating arms 96 are pushed down, which subsequently places tension on the springs 94 and provides resistance, slowing the seat back 26 descent. The device also aids the caregiver in raising the patient's upper body to a sitting position by providing a force from the springs 94 to the seat back 26. The caregiver can adjust the lower turnbuckles 92 to provide more or less spring tension based on the weight of the patient. This device also acts as a safety device for the patient in the event that the spring-loaded safety pins 78 discussed above fail to engage one of the holes in the frame and the upper body weight of the patient causes the seat back 26 to recline at a rapid rate.

Figure 7:
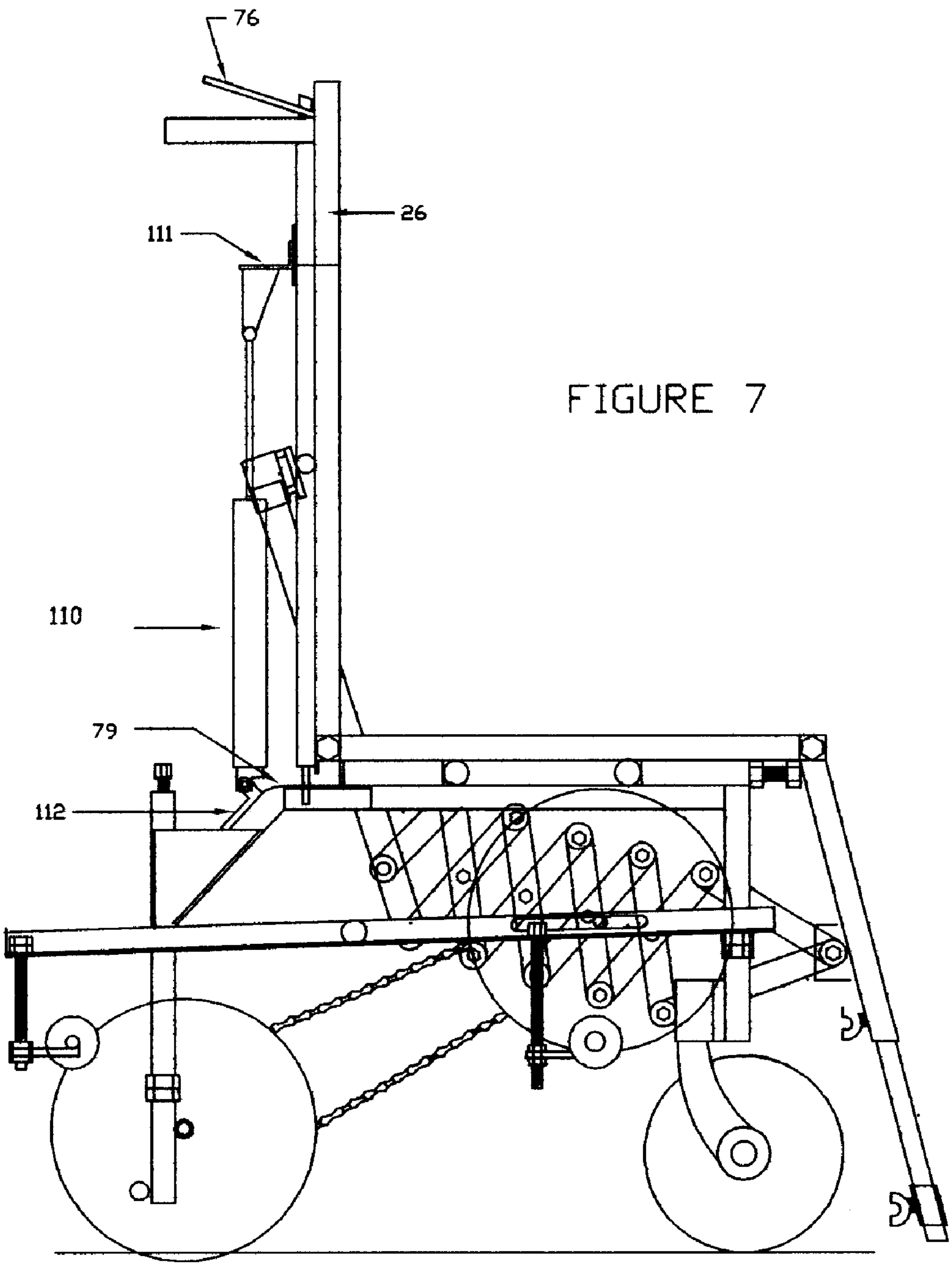
FIG. 7 is a side view of an exemplary wheelchair of the present invention showing a pneumatic safety cylinder.

One alternative to the spring tension device 90 is an optional pneumatic cylinder 110 as shown in FIG. 7. One end 112 of the pneumatic cylinder 110 may be connected to the rear wheelchair frame while the other end 111 is connected to the seat back 26. In the event that the safety handle 76 is accidentally depressed, the pneumatic cylinder 110 can provide resistance to the patient's upper body weight and slow the seat back 26 descent. In one embodiment of the present invention, a pneumatic cylinder 110 may be used in combination with a spring tension device 90.

Figure 8:
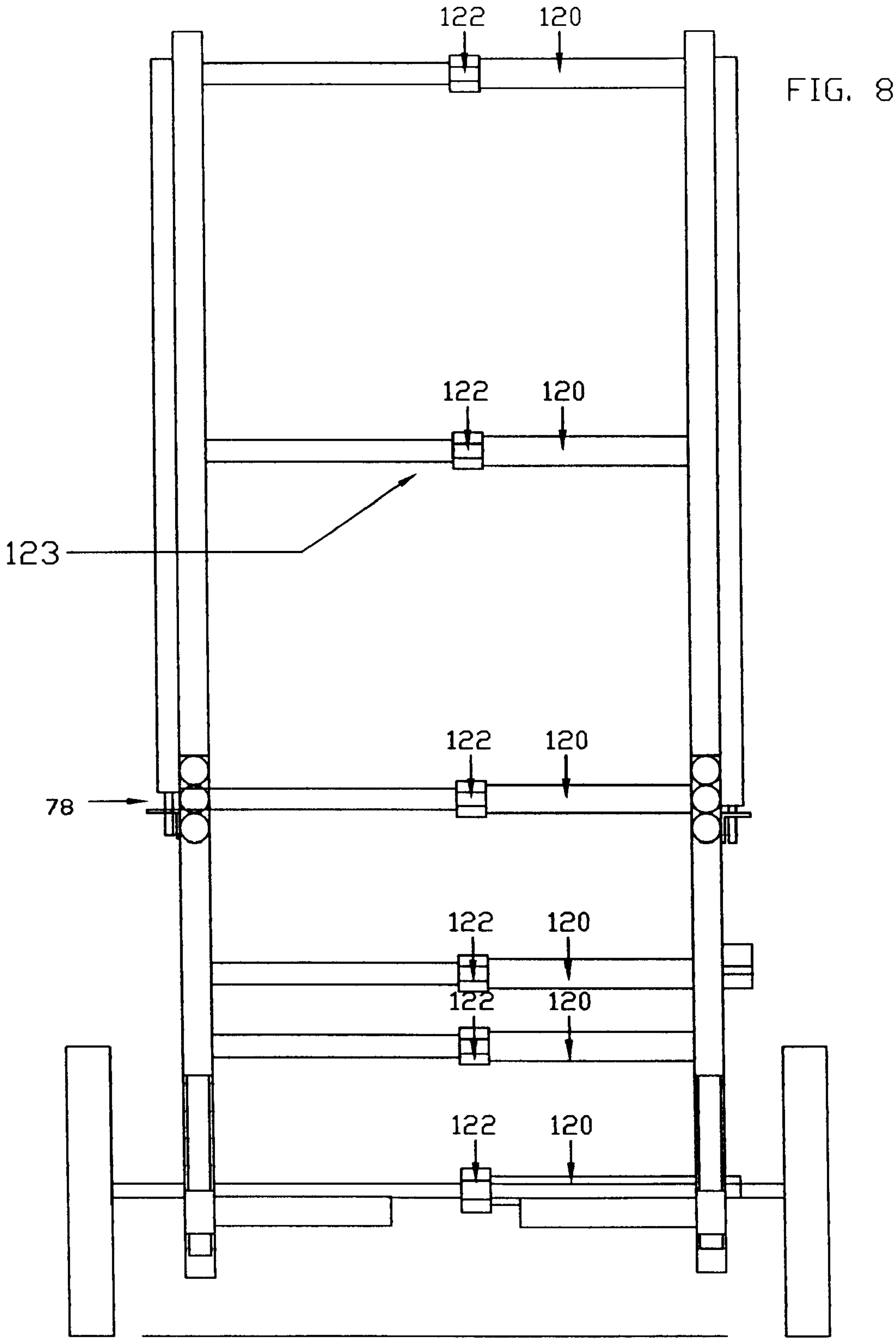
FIG. 8 is a rear view of an exemplary wheelchair of the present invention showing optional adjustable lateral support members.

The wheelchair of the present invention is adjustable to fit patients of various sizes and weights, as well as, to be used in conjunction with standard size door frames and beds of varying heights. FIG. 8 depicts lateral frame components comprising telescoping support tubes 120 with adjustment nuts 122 at the tube junctions 123. Adjustment nuts 122 can be loosened to allow for width adjustment and then tightened at the desired chair width to fit the size of the patient. It should be noted that any other device may be used to adjust the width of the wheelchair of the present invention including, but not limited to, an adjustable screw mechanism or a scissors mechanism.

Figure 9:
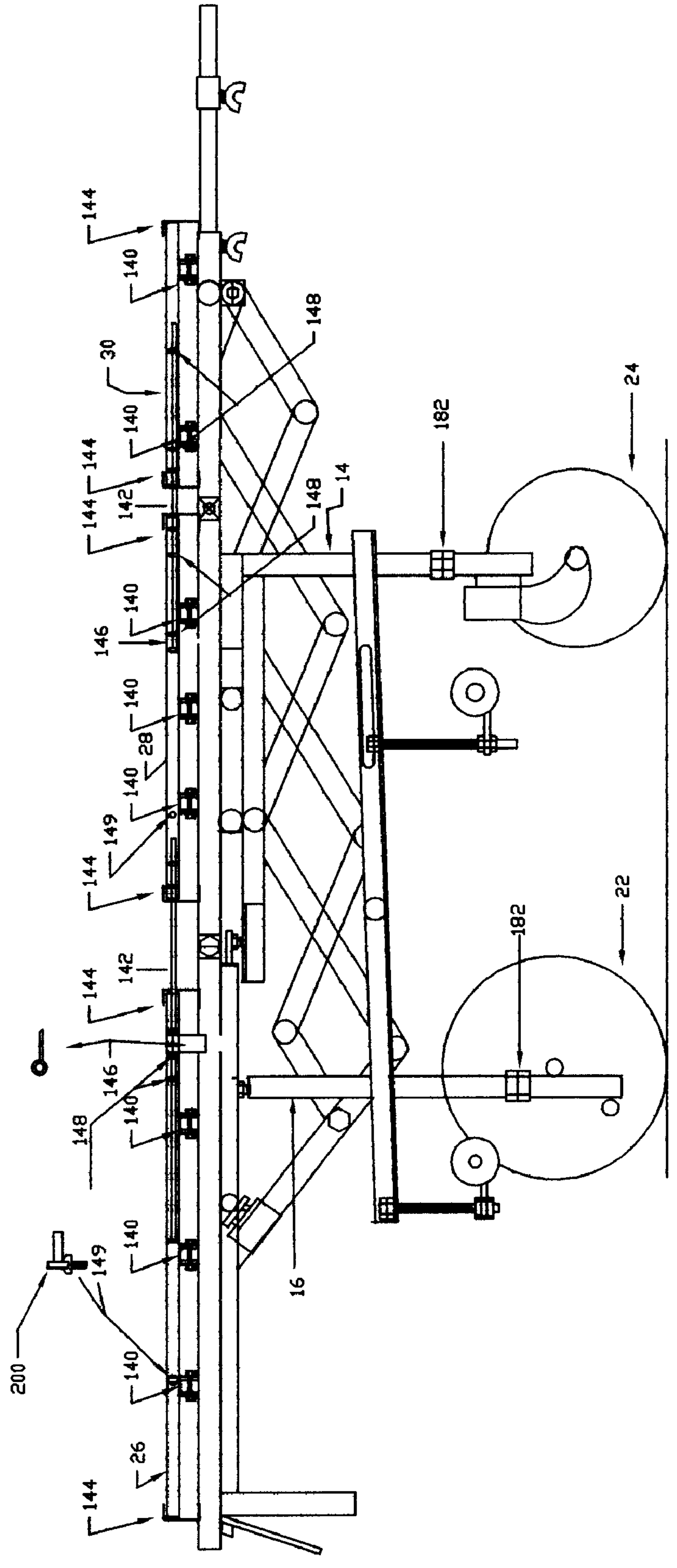
FIG. 9 is a side view of an exemplary wheelchair of the present invention in a gurney position showing an optional rolling transfer assembly.

FIG. 9 illustrates the height versatility of the wheelchair of the present invention. Frame tubes 14 and 16, to which the ground engaging wheels 22 and 24 are attached, are threaded and attached to the chair frame with adjustment nuts 182 that allow the chair to be adjusted vertically to match the height of the bed when the chair is in a gurney position. The wheelchair headrest 46 and footrests 32 (shown in FIG. 4) are likewise adjustable to accommodate patients of different heights.

Figure 10:
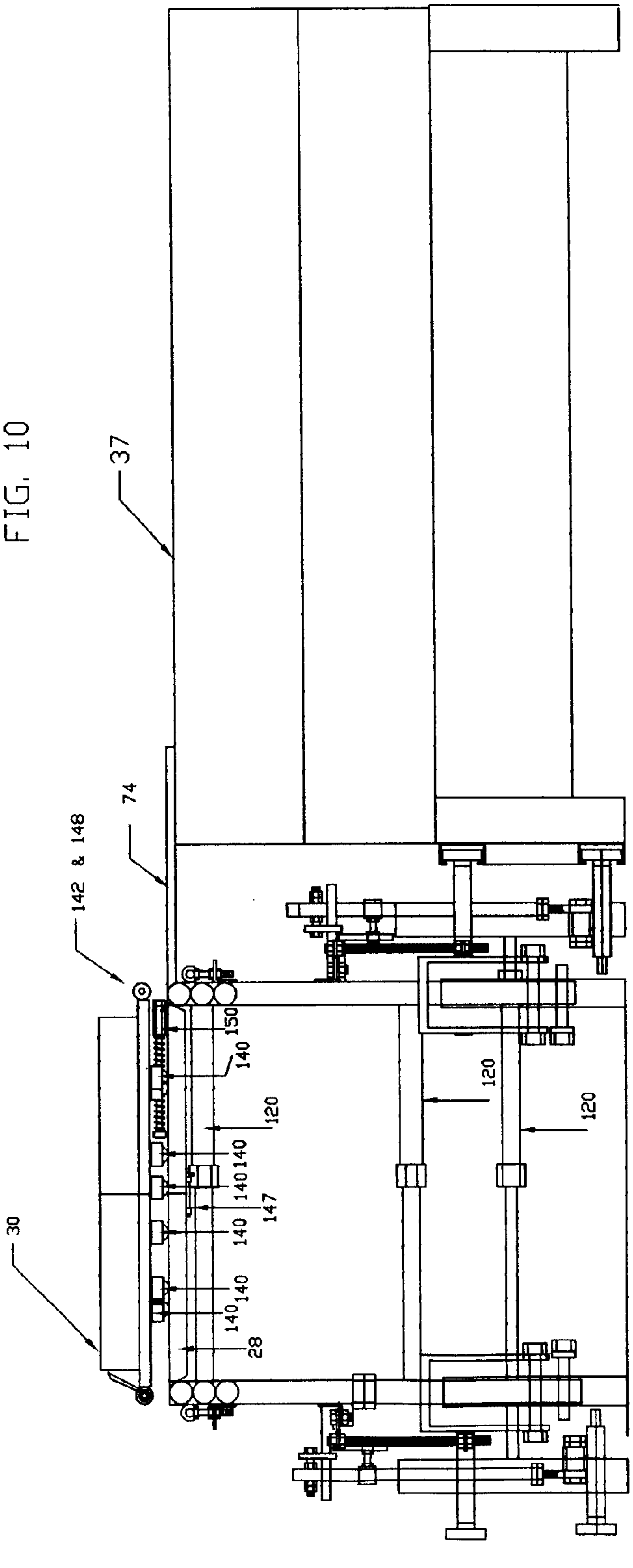
FIG. 10 is a front view of an exemplary wheelchair of the present invention in a gurney position, locked to a bed, and ready for patient transfer showing the optional rolling transfer assembly.

FIGS. 9 and 10 show the optional rolling transfer accessory of wheelchair A, which facilitates patient transfer, particularly for a caregiver of limited strength. The rolling transfer accessory comprises seat back 26, seat 28, and leg supports 30, which are locked together to form one unit (hereinafter referred to as a "gurney") with rollers 140 attached underneath that allow the gurney to roll laterally off of the wheelchair and across the bed bridge. The seat back 26, seat 28, and leg supports 30 are locked together as one unit with locking rods 142 that slide through eye bolts 148 on the sides of the seat back 26, seat 28, and leg supports 30. When stored, the locking rods 142 may be secured in an unlocked position by placing a bolt 149 or other obstruction against a flange (not shown) on the end of locking rod 142 to prevent locking rod 142 from sliding into an engagement position with eye bolts 148 and 149 (see FIG. 9). Locking rod 142 is then released by removing bolt 149 or other obstruction from the path of locking rod 142 and then sliding locking rod 142 into place. Any other method of securing locking rod 142 may be used including, but not limited to, pins, clips, and magnets.

Figures 10A, 10B:
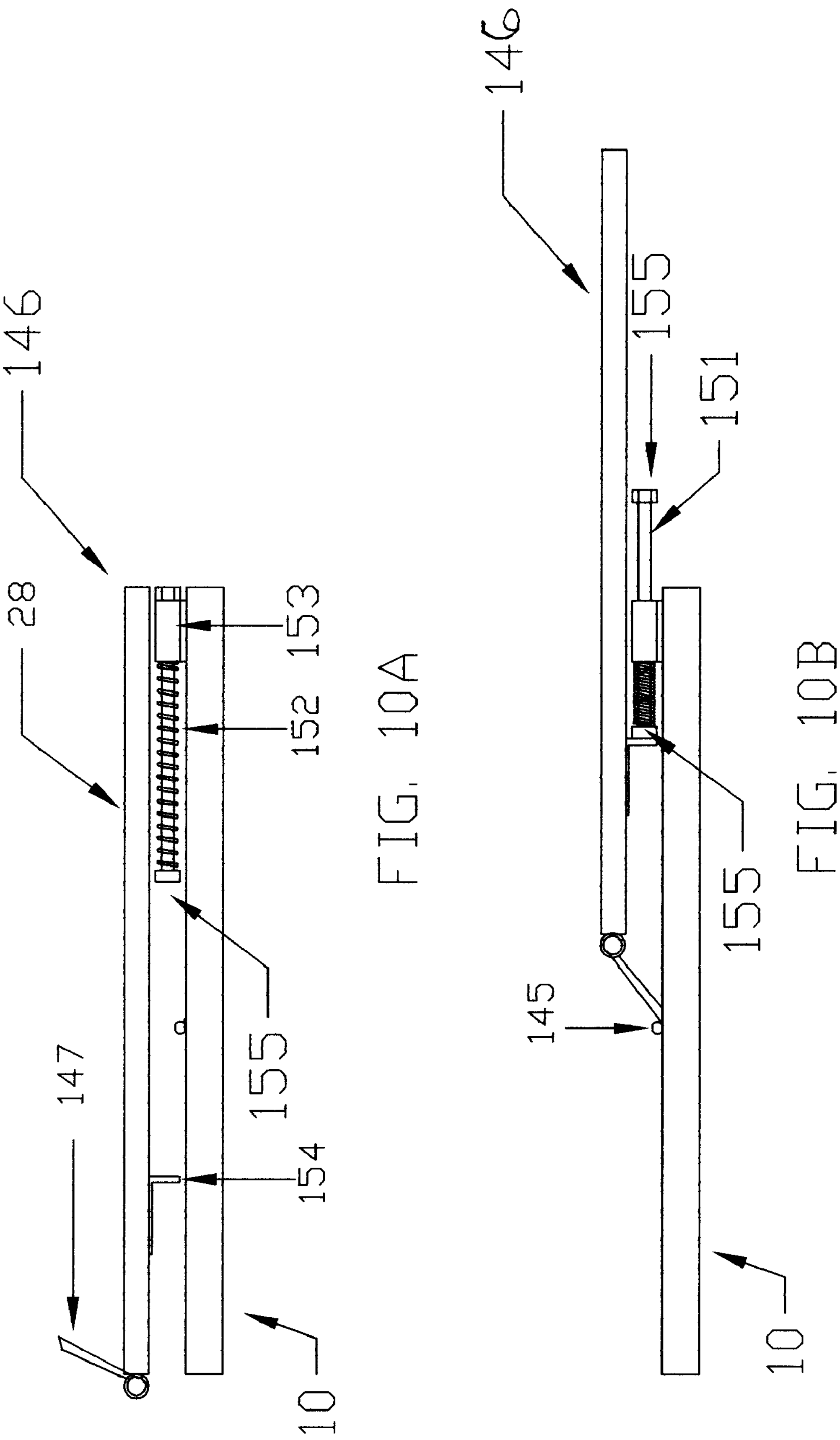
FIGS. 10A and 10B depict detailed views of a spring and lock mechanism for the optional roller transfer assembly of FIG. 10 in an unlocked position and locked position, respectively.

When using the optional rolling transfer accessory, each gurney component (seat back 26, seat 28, and leg supports 30) slides within channel-type guide rails 144 that secure the gurney component to the wheelchair and also ensure that the gurney rolls laterally in a linear path. FIGS. 10A and 10B show an exemplary gurney locking device 146 that stops the gurney in its outermost position on the bed bridge, ensuring the safety of the patient while the transfer takes place from the gurney to the bed. As shown in FIG. 10A, gurney locking device 146 consists of a pin 147 mounted on the side of seat 28 such that pin 147 may freely rotate, moving in a vertical direction, around a longitudinal axis of seat 28. The length of the pin 147, l, exceeds a height, h, of seat 28 above longitudinal support member 10. FIG. 10A depicts gurney locking device 146 in an unlocked position, wherein seat 28 is positioned substantially above longitudinal support member 10. FIG. 10B depicts gurney locking mechanism 146 in a locked position, wherein seat 28 is positioned at least partially over the bed bridge (not shown).

When the caregiver rotates pin 147 to its down position and rolls the gurney across the bed bridge, the gurney locking device 146 will traverse a locking pin 145 (see FIG. 10B). Once the gurney locking device crosses locking pin 145, locking pin 145 prevents the gurney from returning to an unlocked position until the gurney locking device 146 is manually raised by the caregiver to allow pin 147 to pass over locking pin 145. It should be noted that the present invention is not limited to this particular method of locking the gurney in place on the bed bridge. Any other locking mechanism may be used in the present invention. When pin 147 is disengaged from locking pin 145, the gurney automatically returns to a position over wheelchair A.

The roller transfer accessory is also equipped with a gurney retractor assembly (FIGS. 10A and 10B) that serves as a positive stop for the gurney during patient transfer (see FIG. 10B), to automatically retract the empty gurney when the gurney locking device 146 is deactivated (i.e., to facilitate retraction of the gurney when a patient is loaded) (see FIG. 10A). The gurney retractor assembly includes a collar 153 rigidly mounted to longitudinal support member 10 at an edge of the wheelchair beneath seat 28. A spring rod 151 slides through collar 153 and has flanges 155 on either end of the spring rod with diameters greater than that of collar 153 to prevent the spring rod 151 from sliding out of collar 153 (in one embodiment, the spring rod 151 is a bolt with a bolt head on one end and a nut on the other). The spring rod 151 runs through a spring 152 that spans the distance between the inside flange 155 of the spring rod 151 and collar 153. A pressure plate 154 is rigidly mounted to the bottom of seat 28.

As the gurney is rolled laterally across the bed bridge, pressure plate 154 engages the inside flange 155 of the spring rod 151 (see FIG. 10B). As the gurney continues to roll, the spring rod 151 slides through collar 153 and compresses the spring 152. When spring 152 is fully compressed, the gurney retractor assembly becomes a positive stop for the gurney, and the gurney locking device 146 engages locking pin 145 to hold the gurney in place. The mounting location of pressure plate 154, the spring rod length, and the corresponding spring length are such that the gurney reaches the positive stop and engages the gurney locking device 146 as the rollers approach the edge of the bed bridge. When the caregiver raises pin 147, disengaging locking pin 145, the spring force retracts the empty gurney to its starting (i.e., "unlocked") position, or, if transferring a patient from the bed to the wheelchair, assists the caregiver in rolling the full gurney back to the wheelchair. FIGS. 10A and 10B show one gurney retractor assembly and gurney locking device for use when moving the roller transfer accessory in one direction. Wheelchair A may also include an identical mirror image setup of the above-described assemblies for use when moving the roller transfer accessory in the other direction.

The transfer process may also entail securing wheelchair A to a bed 37, converting the wheelchair to a gurney position, and locking the bed bridge into place (see FIG. 10). The caregiver locks the seat back 26, seat 28, and leg supports 30 together by first pulling the end of locking rod 142 outward, such that flange 200 on locking rod 142 clears bolt head 149 and then sliding the locking rod 142 through corresponding eye bolts 146 on the adjacent gurney component, as described above with reference to FIG. 9. This is done for both locking rods 142 on the side of the gurney adjacent to bed 37. The patient, lying on the gurney, is rolled across the bed bridge toward bed 37 to a positive stop. Once the patient is safely on bed 37, the lock is released and the gurney retracts automatically to the wheelchair with the aid of the gurney retractor assembly 150.

When transferring a patient from a bed to a wheelchair, a caregiver may perform one or more of the following steps: locking the wheelchair to the bed, converting the wheelchair into a gurney position, locking the bed bridge into place, locking the seat back, seat, and leg supports together to form the gurney, rolling the gurney over the bed bridge toward the bed to a positive stop position where the gurney is locked in place, rolling the patient onto the gurney, releasing the gurney locking device, which automatically returns the gurney back to the wheelchair with the aid of the gurney retractor assembly, removing the locking rods from the gurney to return the seat back, seat, and leg supports to independent movement, and converting the wheelchair from a gurney position to a sitting position.

Figure 11A:
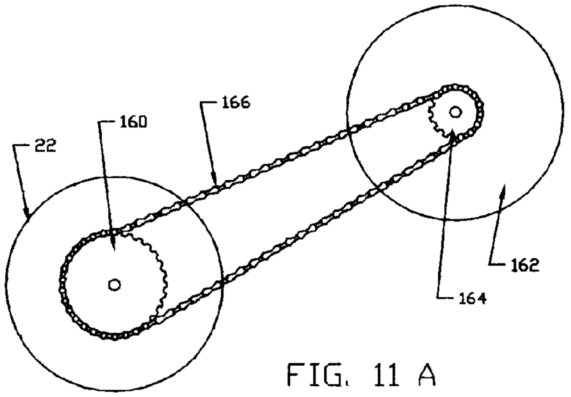
FIG. 11A is a detailed view of the manual drive wheel assembly shown in FIG. 11.
Figure 11:
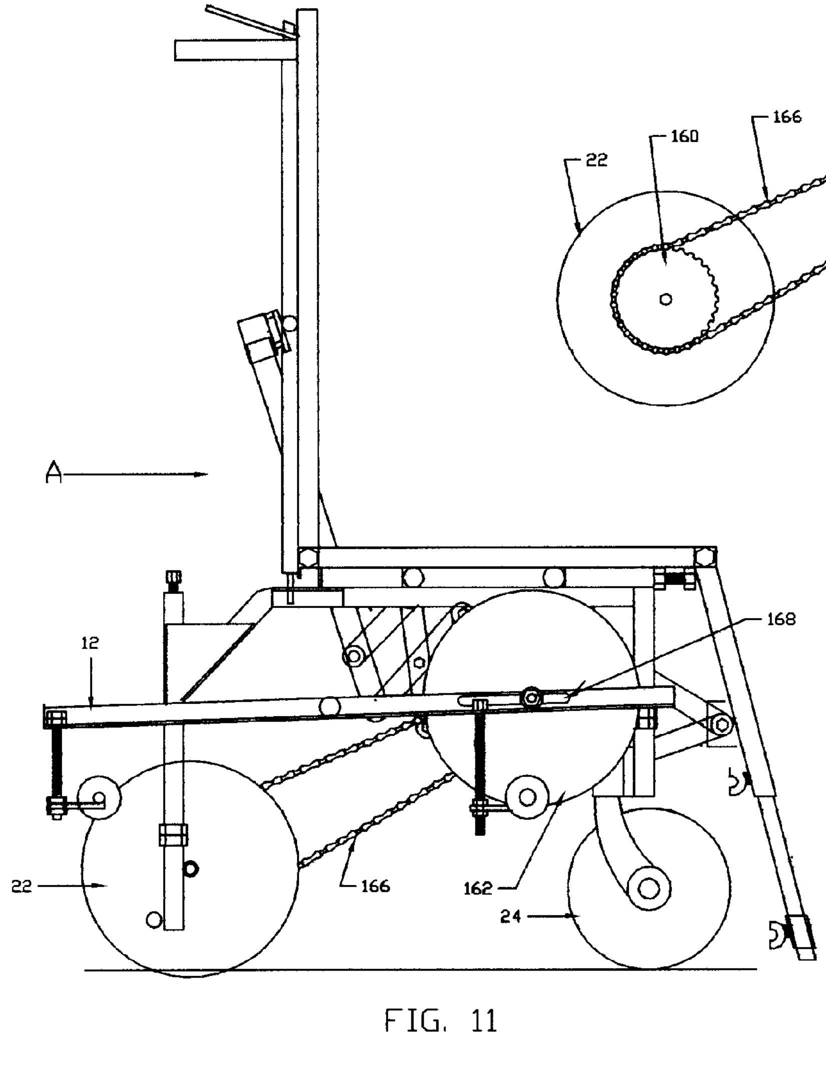
FIG. 11 is a side view of an exemplary wheelchair of the present invention showing a manual drive wheel assembly.

FIG. 11 depicts an optional manual propulsion device for the wheelchair of the present invention. A sprocket 160 (see FIG. 11A) is connected to each of the rear drive wheels 22. A hand wheel 162 is mounted to longitudinal member 12 on each side of wheelchair A. A sprocket 164 (see FIG. 11A) is attached to each hand wheel 162. Hand wheels 162 are then coupled to drive wheels 22 with chain 166, which engages the sprocket teeth of sprockets 160 and 164. Sprockets 160 and 164 may be any size ratio for ease of operation. This ratio may be customized for the patient if desired. Hand wheel 162 may be mounted in a slot 168 in longitudinal member 12 that allows hand wheel 162 to be moved linearly along the wheelchair's longitudinal member 12 to adjust chain tension.

In a further embodiment of the present invention, wheelchair A may be motorized using any means or device known in the art. Each and every movable element of wheelchair A described above may be electronically controlled and motorized as desired. For example, any one or more of safety handle 76, pin locking mechanism 78, scissor mechanism 40, bed bridge components (i.e., top rail 70, arm rail 72 and leg rail 74), seat back reclining mechanism (i.e., spring tension device 90 and/or pneumatic cylinder 110), wheelchair width and height adjustment mechanisms (i.e., telescoping support tubes 120 with adjustment nuts 122, and height adjustment nuts 182), roller transfer accessory mechanism, gurney locking mechanism (i.e., locking rods 142 with bolts 149), gurney transfer assembly, and the wheelchair itself, may be electronically controlled and/or motorized.

Wheelchair A is designed for patient comfort and ease of maintenance and sanitation. The top rail 70 (shown in FIG. 5) may be folded as to not obstruct the patient's view and is padded for use as a comfortable headrest for napping. The wheelchair contains a padded adjustable vertical headrest 46 and adjustable footrests 32 (shown in FIG. 4) to accommodate patients of varying heights. As discussed above, the wheelchair is adjustable in width to accommodate large or small patients. The padded leg supports, seat, and seat back may be easily removed for cleaning and to aid in any maintenance or wheelchair adjustments. The leg supports may be hinged to swing open, making it easier for the patient to stand.

Wheelchair A also may be fitted with a commode accessory (not shown). The seat is held in place using snaps, clips, buttons, VELCRO, or any other means commonly used in the field. The seat may be unfastened, removed, and replaced with a similar seat that includes a cutout in the center wherein a bed-pan type container is suspended. This accessory eliminates the need for addition transfers from the wheelchair to a toilet and then from a toilet to the wheelchair. The accessory is easily removed to be clean and replaced with the original seat 28 when not needed.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A reclinable wheelchair comprising:

a frame;

at least two rear wheels and at least one front wheel attached to the frame for providing mobility to the wheelchair;

a seat back, a seat, and leg supports for supporting a patient sitting into the wheelchair;

a reclining mechanism attached to the seat back and the leg supports, wherein the mechanism allows the seat back to recline up to 90 degrees and the leg supports to raise up to 90 degrees so that the seat back, the seat, and the leg supports form a flat surface substantially in a horizontal plane;

at least one locking wheel for securing the wheelchair to a bed, the locking wheel being attached to the frame and positioned along at least one side of the wheelchair; and an actuator assembly comprising one or more actuator wheels, and one or more actuator arms; said one or more actuator wheels being movable from a lower position to an upward position relative to the at least one locking wheel, and as said one or more actuator wheels move from a lower position to an upward position, said one or more actuator arms engage with the reclining mechanism causing the seat back, the seat and the leg supports to transform from a sitting configuration to the flat surface substantially in a horizontal plane.

2. The wheelchair of claim 1, further comprising a locking pin device capable of locking the seat back in one or more positions ranging from a substantially vertical sitting position to a substantially horizontal position.

3. The wheelchair of claim 1, wherein the reclining mechanism comprises a scissor mechanism.

4. The wheelchair of claim 1, wherein the reclining mechanism comprises a pneumatic mechanism.

5. The wheelchair of claim 1, further comprising one or more top rails, one or more arm rails, and one or more leg rails, wherein the rails, when in a folded state, form padded rails, and when in an unfolded state, form a bed bridge.

6. The wheelchair of claim 1, wherein the frame is expandable in a width direction for accommodating narrow or wide patients.

7. The wheelchair of claim 1, wherein the frame is expandable in a height direction for accommodating short or tall patients.

8. The wheelchair of claim 1, further comprising a drive hand wheel for turning the rear wheels.

9. The wheelchair of claim 1, further comprising a motor for turning the rear wheels.

10. The wheelchair of claim 1, wherein the seat back, the seat, and the leg supports form a flat platform when in a horizontal plane; and wherein the flat platform is capable of rolling from a first position on the wheelchair to a second position on a bed bridge formed by unfolded top, arm, and leg rails.

11. The wheelchair of claim 1, further comprising a bed having a locking track attached thereto, wherein the at least one locking wheel of the wheelchair is interlockable with the locking track of the bed.

12. In combination, a reclinable wheelchair and a bed, wherein the reclinable wheelchair comprises:

a frame;

at least two rear wheels and at least one front wheel attached to the frame for providing mobility to the wheelchair;

a seat back, a seat, and leg supports for supporting a patient sitting into the wheelchair;

a reclining mechanism attached to the seat back and the leg supports, wherein the mechanism allows the seat back to recline up to 90 degrees and the leg supports to raise up to 90 degrees so that the seat back, the seat, and the leg supports form a flat surface substantially in a horizontal plane;

at least one locking wheel for securing the wheelchair to a bed, the locking wheel being attached to the frame and positioned along at least one side of the wheelchair; and an actuator assembly comprising one or more actuator wheels, and one or more actuator arms; said one or more actuator wheels being movable from a lower position to an upward position relative to the at least one locking wheel, and as said one or more actuator wheels move from a lower position to an upward position, said one or more actuator arms engage with the reclining mechanism causing the seat back, the seat and the leg supports to transform from a sitting configuration to the flat surface substantially in a horizontal plane; and wherein the bed comprises:

at least one locking track attached to at least one side of the bed, wherein the at least one locking wheel of the wheelchair is interlockable with the locking track of the bed.

13. The combination of claim 12, wherein the wheelchair further comprises a locking pin device capable of locking the seat back in one or more positions ranging from a substantially vertical sitting position to a substantially horizontal position.

14. The combination of claim 12, wherein the wheelchair further comprises one or more top rails, one or more arm rails, and one or more leg rails, wherein the rails, when in a folded state, form padded rails, and when in an unfolded state, form a bed bridge between the wheelchair and the bed.

15. The combination of claim 12, wherein the wheelchair further comprises a drive hand wheel for turning the rear wheels.

16. The combination of claim 12, wherein the wheelchair further comprises a motor for turning the rear wheels.

17. The combination of claim 12, wherein the seat back, the seat, and the leg supports form a flat platform when in a horizontal plane; and wherein the flat platform is capable of rolling from a first position on the wheelchair to a second position on a bed bridge formed by unfolded top, arm, and leg rails.

18. The combination of claim 12, wherein the bed further comprises at least one actuator track attached to the same side of the bed as the at least one locking track; said at least one actuator track being inclined so as to have a lower portion of actuator track connected to an upper portion of actuator track; said one or more actuator wheels of the actuator assembly being interlockable with the at least one actuator track along the lower portion of actuator track when the reclinable wheelchair is in a sitting configuration, and being movable along the actuator track to the upper portion of actuator track.

19. A reclinable wheelchair comprising:

a frame;

at least two rear wheels and at least one front wheel attached to the frame for providing mobility to the wheelchair;

a seat back, a seat, and leg supports for supporting a patient sitting into the wheelchair;

a reclining mechanism attached to the seat back and the leg supports, wherein the mechanism allows the seat back to recline up to 90 degrees and the leg supports to raise up to 90 degrees so that the seat back, the seat, and the leg supports form a flat surface substantially in a horizontal plane;

at least one locking wheel for securing the wheelchair to a bed, the locking wheel being attached to the frame and positioned along at least one side of the wheelchair; and one or more top rails, one or more arm rails, and one or more leg rails, wherein the rails, when in a folded state, form padded rails, and when in an unfolded state, form a bed bridge.

20. A reclinable wheelchair comprising:

a frame;

at least two rear wheels and at least one front wheel attached to the frame for providing mobility to the wheelchair;

a seat back, a seat, and leg supports for supporting a patient sitting into the wheelchair;

a reclining mechanism attached to the seat back and the leg supports, wherein the mechanism allows the seat back to recline up to 90 degrees and the leg supports to raise up to 90 degrees so that the seat back, the seat, and the leg supports form a flat surface substantially in a horizontal plane; and at least one locking wheel for securing the wheelchair to a bed, the locking wheel being attached to the frame and positioned along at least one side of the wheelchair;

wherein the seat back, the seat, and the leg supports form a flat platform when in a horizontal plane; and wherein the flat platform is capable of rolling from a first position on the wheelchair to a second position on a bed bridge formed by unfolded top, arm, and leg rails.

21. In combination, a reclinable wheelchair and a bed, wherein the reclinable wheelchair comprises:

a frame;

at least two rear wheels and at least one front wheel attached to the frame for providing mobility to the wheelchair;

a seat back, a seat, and leg supports for supporting a patient sitting into the wheelchair;

a reclining mechanism attached to the seat back and the leg supports, wherein the mechanism allows the seat back to recline up to 90 degrees and the leg supports to raise up to 90 degrees so that the seat back, the seat, and the leg supports form a flat surface substantially in a horizontal plane;

at least one locking wheel for securing the wheelchair to a bed, the locking wheel being attached to the frame and positioned along at least one side of the wheelchair; and one or more top rails, one or more arm rails, and one or more leg rails, wherein the rails, when in a folded state, form padded rails, and when in an unfolded state, form a bed bridge between the wheelchair and the bed; and wherein the bed comprises:

at least one locking track attached to at least one side of the bed, wherein the at least one locking wheel of the wheelchair is interlockable with the locking track of the bed.

* * * * *